US012657372B2

(12) United States Patent
Lu et al.

(10) Patent No.: US 12,657,372 B2
(45) Date of Patent: Jun. 16, 2026

(54) METHOD, DEVICE, COMPUTER EQUIPMENT AND STORAGE MEDIUM FOR EDITING PDF FILES

(71) Applicant: KDAN MOBILE SOFTWARE LTD., Tainan City (TW)

(72) Inventors: Sheng-Jun Lu, Tainan City (TW); Guo-Lin Jia, Tainan City (TW); Chao Wang, Tainan City (TW); Yuan Tao, Tainan City (TW); Wen-Wei Lin, Tainan City (TW)

(73) Assignee: KDAN MOBILE SOFTWARE LTD., Tainan City (TW)

( * ) Notice: Subject to any disclaimer, the term of this patent is extended or adjusted under 35 U.S.C. 154(b) by 120 days.

(21) Appl. No.: 18/373,309

(22) Filed: Sep. 27, 2023

(65) Prior Publication Data

US 2024/0202429 A1     Jun. 20, 2024

(30) Foreign Application Priority Data

Dec. 20, 2022    (CN) .......................... 202211649226.5

(51) Int. Cl.
*G06F 40/103*        (2020.01)
*G06F 40/106*        (2020.01)
(Continued)

(52) U.S. Cl.
CPC .......... *G06F 40/166* (2020.01); *G06F 40/103* (2020.01); *G06F 40/106* (2020.01);
(Continued)

(58) Field of Classification Search
CPC .......................... G06F 40/177; G06V 30/413; G06V 30/1908; G06V 30/19007; G06V 30/10;
(Continued)

(56) References Cited

U.S. PATENT DOCUMENTS 6,009,196 A * 12/1999 Mahoney ............. G06V 30/413
                                                      382/176
6,336,124 B1 * 1/2002 Alam .................... G06F 40/151
                                                      715/205
(Continued)

FOREIGN PATENT DOCUMENTS

CN        107977346 A      5/2018
CN        112417826 A      2/2021

*Primary Examiner* — Benjamin Smith
(74) *Attorney, Agent, or Firm* — WPAT, PC

(57)                ABSTRACT
There is provided a device for editing a PDF file, including a display, a non-volatile storage medium, a memory and a processor. The non-volatile storage medium stores a computer program. The memory provides an environment for operations of the computer program in the non-volatile storage medium. The processor runs the computer program to parse the PDF file to obtain information of characters, generate character sets according to features of the characters, generate line sets according to heights and horizontal positions of the character sets, generate paragraph sets according to a height and a horizontal position of each line of the line sets, generate text region sets according a height and a horizontal position of each paragraph of the paragraph sets, and control the display to show the text region sets in the PDF file as editable text regions.

17 Claims, 8 Drawing Sheets

(51) Int. Cl.
    *G06F 40/109*     (2020.01)
    *G06F 40/166*     (2020.01)
    *G06F 40/205*     (2020.01)
    *G06V 30/10*     (2022.01)
    *G06V 30/413*     (2022.01)
    *G06V 30/414*     (2022.01)

(52) U.S. Cl.
    CPC .......... *G06F 40/109* (2020.01); *G06F 40/205* (2020.01); *G06V 30/10* (2022.01); *G06V 30/413* (2022.01); *G06V 30/414* (2022.01)

(58) Field of Classification Search
    CPC .... G06V 30/414; G06V 30/412; G06V 30/40; G06V 30/416; G06V 30/41
    See application file for complete search history.

(56) References Cited

U.S. PATENT DOCUMENTS

| | | | | |
|---|---|---|---|---|
| 7,257,253 | B2 * | 8/2007 | Ozawa | G06V 30/414 |
| | | | | 382/176 |
| 7,392,472 | B2 * | 6/2008 | Simard | G06V 30/414 |
| | | | | 715/255 |
| 7,561,722 | B2 * | 7/2009 | Harrington | G06V 10/993 |
| | | | | 358/2.1 |
| 7,627,176 | B2 * | 12/2009 | Takebe | G06V 30/414 |
| | | | | 382/176 |
| 8,261,186 | B2 * | 9/2012 | Mansfield | G06F 40/40 |
| | | | | 715/272 |
| 8,352,855 | B2 * | 1/2013 | Levy | G06V 30/413 |
| | | | | 715/276 |
| 8,365,072 | B2 * | 1/2013 | Mansfield | G06F 40/126 |
| | | | | 715/277 |
| 8,438,472 | B2 * | 5/2013 | Mansfield | G06F 40/40 |
| | | | | 715/255 |
| 8,473,467 | B2 * | 6/2013 | Levy | G06V 30/413 |
| | | | | 707/694 |
| 8,832,549 | B2 * | 9/2014 | Mansfield | G06F 40/10 |
| | | | | 715/251 |
| 8,892,992 | B2 * | 11/2014 | Mansfield | G06F 40/117 |
| | | | | 715/272 |
| 9,063,911 | B2 * | 6/2015 | Levy | G06V 30/414 |
| 9,098,471 | B2 * | 8/2015 | Richardson | G06F 40/10 |
| 9,953,008 | B2 * | 4/2018 | Zaric | G06F 40/103 |
| 9,959,259 | B2 * | 5/2018 | Mansfield, III | G06F 40/174 |
| 10,460,162 | B2 * | 10/2019 | Gelosi | G06F 40/131 |
| 10,467,464 | B2 * | 11/2019 | Chen | G06V 30/412 |
| 10,579,707 | B2 * | 3/2020 | Prebble | G06V 30/412 |
| 10,679,087 | B2 * | 6/2020 | Ordonez | G06V 30/153 |
| 10,691,936 | B2 * | 6/2020 | Bellert | G06F 16/93 |
| 10,726,198 | B2 * | 7/2020 | Gelosi | G06F 40/166 |
| 10,970,458 | B1 * | 4/2021 | Dhanuka | G06V 30/416 |
| 11,106,858 | B2 * | 8/2021 | Dhanuka | G06T 11/203 |
| 11,176,310 | B2 * | 11/2021 | Agrawal | G06F 40/103 |
| 11,200,413 | B2 * | 12/2021 | Burdick | G06F 40/284 |
| 11,488,402 | B2 * | 11/2022 | Wang | G06V 30/153 |
| 11,763,079 | B2 * | 9/2023 | Pito | G06F 40/232 |
| | | | | 715/229 |
| 11,803,706 | B2 * | 10/2023 | Pito | G06F 3/0481 |
| 11,977,534 | B2 * | 5/2024 | Thompson | G06V 10/70 |
| 12,067,351 | B2 * | 8/2024 | Schwiebert | G06F 40/151 |
| 12,197,412 | B2 * | 1/2025 | Thompson | G06F 16/2282 |
| 2003/0204816 | A1 * | 10/2003 | Simard | G06V 30/414 |
| | | | | 715/243 |
| 2004/0001628 | A1 * | 1/2004 | Ozawa | G06V 30/414 |
| | | | | 382/187 |
| 2004/0146199 | A1 * | 7/2004 | Berkner | G06F 16/9577 |
| | | | | 382/176 |
| 2006/0204096 | A1 * | 9/2006 | Takebe | G06V 30/414 |
| | | | | 382/176 |
| 2007/0002054 | A1 * | 1/2007 | Bronstein | G06V 30/414 |
| | | | | 345/472.3 |
| 2007/0133842 | A1 * | 6/2007 | Harrington | G06V 30/414 |
| | | | | 382/112 |
| 2010/0174732 | A1 * | 7/2010 | Levy | G06F 40/40 |
| | | | | 707/768 |
| 2010/0174977 | A1 * | 7/2010 | Mansfield | G06V 30/413 |
| | | | | 715/234 |
| 2010/0174980 | A1 * | 7/2010 | Mansfield | G06F 40/174 |
| | | | | 715/234 |
| 2010/0174982 | A1 * | 7/2010 | Mansfield | G06F 40/10 |
| | | | | 715/273 |
| 2010/0174983 | A1 * | 7/2010 | Levy | G06F 40/126 |
| | | | | 715/256 |
| 2010/0174985 | A1 * | 7/2010 | Levy | G06F 40/163 |
| | | | | 715/244 |
| 2011/0280481 | A1 * | 11/2011 | Radakovic | G06V 10/987 |
| | | | | 382/311 |
| 2012/0185491 | A1 * | 7/2012 | Mansfield | G06F 16/00 |
| | | | | 707/E17.058 |
| 2013/0014007 | A1 * | 1/2013 | Kopp | G06F 40/103 |
| | | | | 715/243 |
| 2013/0042172 | A1 * | 2/2013 | Mansfield | G06F 40/126 |
| | | | | 715/234 |
| 2013/0174017 | A1 * | 7/2013 | Richardson | G06F 40/10 |
| | | | | 715/234 |
| 2013/0185631 | A1 * | 7/2013 | Mansfield, III | G06F 40/174 |
| | | | | 715/273 |
| 2013/0195315 | A1 * | 8/2013 | Baheti | G06T 11/60 |
| | | | | 382/176 |
| 2014/0208191 | A1 * | 7/2014 | Zaric | G06F 40/10 |
| | | | | 715/201 |
| 2015/0095769 | A1 * | 4/2015 | Zhang | G06V 30/413 |
| | | | | 715/243 |
| 2015/0324338 | A1 * | 11/2015 | Levy | G06F 40/106 |
| | | | | 715/244 |
| 2017/0351913 | A1 * | 12/2017 | Chen | G06V 30/412 |
| 2019/0114479 | A1 * | 4/2019 | Gelosi | G06F 40/166 |
| 2019/0205362 | A1 * | 7/2019 | Prebble | G06F 40/103 |
| 2019/0220503 | A1 * | 7/2019 | Gelosi | G06F 40/177 |
| 2019/0325247 | A1 * | 10/2019 | Ordonez | G06V 30/15 |
| 2020/0005033 | A1 * | 1/2020 | Bellert | G06F 16/93 |
| 2020/0042785 | A1 * | 2/2020 | Burdick | G06V 30/416 |
| 2020/0311185 | A1 * | 10/2020 | Agrawal | G06F 40/103 |
| 2021/0224465 | A1 * | 7/2021 | Dhanuka | G06T 11/203 |
| 2021/0294974 | A1 * | 9/2021 | Gao | G06F 40/166 |
| 2021/0365708 | A1 * | 11/2021 | Wang | G06V 30/158 |
| 2022/0284175 | A1 * | 9/2022 | Schwiebert | G06V 30/158 |
| 2022/0318224 | A1 * | 10/2022 | Thompson | G06V 10/70 |
| 2023/0005286 | A1 * | 1/2023 | Yebes Torres | G06Q 30/0283 |
| 2024/0111942 | A1 * | 4/2024 | Prebble | G06F 40/117 |
| 2024/0362197 | A1 * | 10/2024 | Thompson | G06V 30/413 |

* cited by examiner

100

PR1

TR1 — Open Email Attachments

TR2
1. Open the mail in your mail app.
2. Tap and hold on the attachment.
3. Select PDF Reader Pro to open in.
4. A copy will be saved to the app.

TR3 — Note: Locate backups of your iPhone, iPad, and iPod tuoch:
https://support.apple.com/en-ac/HT204215#findiTunes

METHOD, DEVICE, COMPUTER EQUIPMENT AND STORAGE MEDIUM FOR EDITING PDF FILES

CROSS-REFERENCE TO RELATED APPLICATIONS

This application claims the priority benefit of Chinese Patent Application Serial Number 202211649226.5, filed on Dec. 20, 2022, the full disclosure of which is incorporated herein by reference.

FIELD OF THE DISCLOSURE

This disclosure generally relates to the file processing and, more particularly, to a method, a device, a computer equipment and a storage medium that transform a portable document format (PDF) to an editable PDF file which includes multiple text regions and/or graphic regions.

BACKGROUND OF THE DISCLOSURE

The PDF files are generally used electronic files. Although a PDF file can be read almost on any operating system, the PDF file cannot be edited directly. During editing a PDF file, the prior art is to transform the PDF file to a document having another format, e.g., Office Software. Therefore, if a PDF file requires only a little amendment, it is still necessary to transform the whole PDF file to a document having another format. After the editing is completed, the edited document is converted back to a PDF file again such that it is inconvenient and time wasting.

SUMMARY

Accordingly, the present disclosure provides a method, a device, a computer equipment and a storage medium that transform a PDF to an editable PDF file which includes multiple text regions and/or graphic regions. In editing the editable PDF file, a user only needs to select one text region or one graphic region in the editable PDF file for little amendment directly. After the editing is completed, the edited file is restored as a PDF file.

The present disclosure provides an editable PDF file in which a region for editing is directly selected in the editable PDF file. Because no transformation of document format is required, the user experience is improved.

The present disclosure further provides a method, a device, a computer equipment and a storage medium that transform a PDF file to an editable PDF file.

The present disclosure provides a method for recognizing a PDF file, including the steps of: parsing text objects of the PDF file to obtain information of characters; identifying features of adjacent characters in a horizontal direction, and merging characters having identical features to obtain character sets; determining line sets according to first vertical pitches and first horizontal pitches of adjacent character sets; determining paragraph sets according to second vertical pitches and second horizontal pitches of adjacent lines of the line sets; and determining text region sets according to third vertical pitches and third horizontal pitches of adjacent paragraphs of the paragraph sets.

The present disclosure further provides a device for providing an editable PDF file. The device includes a display, a non-volatile storage medium, a memory and a processor. The display is configured to show a PDF file. The non-volatile storage medium is configured to record a computer program. The memory is configured to provide an environment for operations of the computer program in the non-volatile storage medium. The processor is configured to run the computer program to parse the PDF file to obtain information of characters, generate character sets according to features of the characters, generate line sets according to heights and horizontal positions of the character sets, generate paragraph sets according to a height and a horizontal position of each line of the line sets, generate text region sets according to a height and a horizontal position of each paragraph of the paragraph sets, and control the display to show the text region sets as editable text regions in the PDF file.

The present disclosure further provides a computer equipment including a storage device and a processor. The storage device is used to record a computer program. The processor is used to run the computer program recorded in the storage device to execute a method for generating an editable PDF file according to one embodiment of the present disclosure.

The present disclosure further provides a content accessible memory recorded with a computer program. The computer program is run by a processor to implement a method for generating an editable PDF file according to one embodiment of the present disclosure.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to provide a method for generating an editable portable document format (PDF) file, a device to recognize a PDF file for editing using the method, and a computer equipment and a content accessible memory using the method. The edited PDF file stored from the editable PDF file generated by the present disclosure may further be opened as an editable PDF file by the device of the present disclosure, or may further be opened as a general (i.e., not directly editable) PDF file by other PDE readers.

Figure 1:
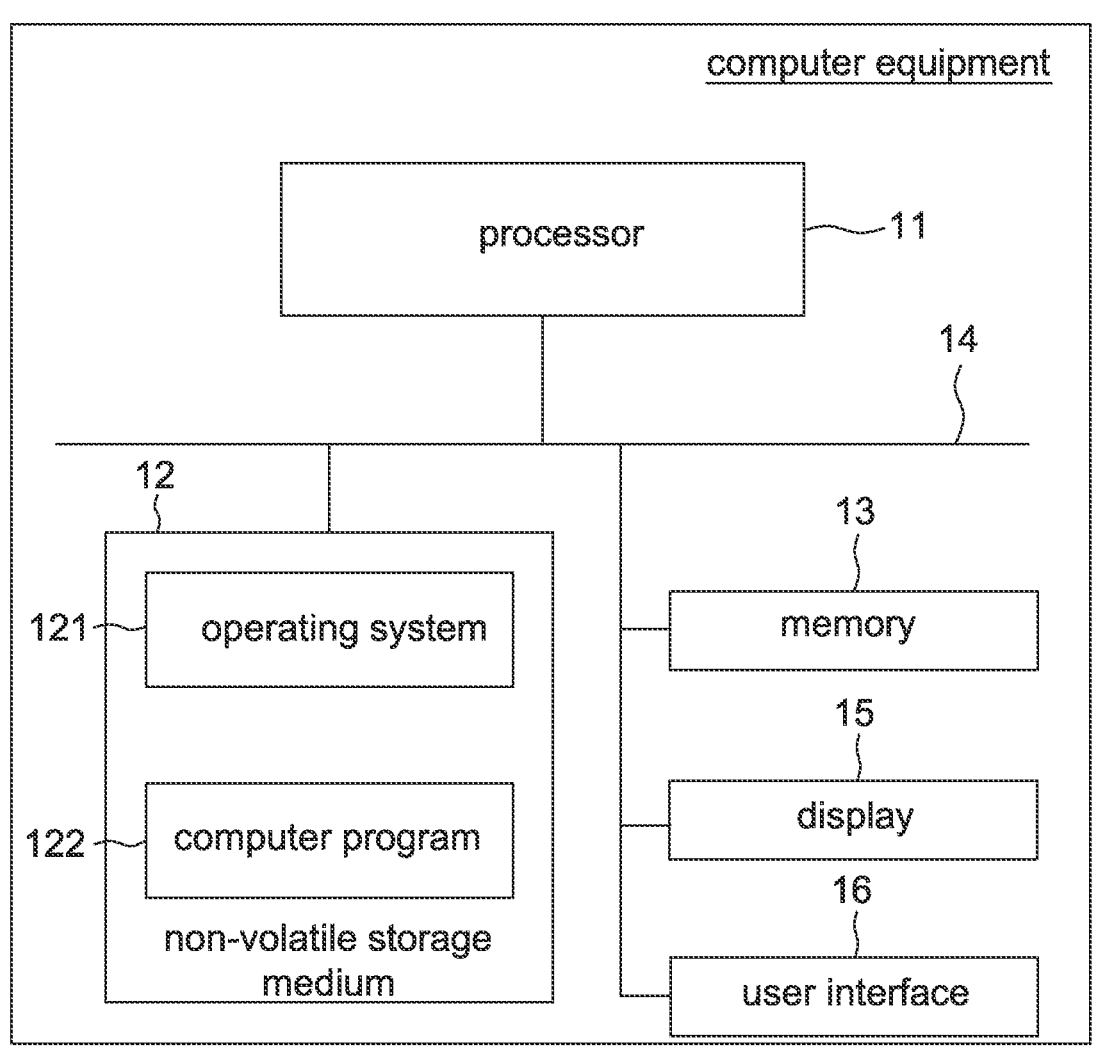
FIG. 1 is a schematic block diagram of a computer equipment according to one embodiment of the present disclosure.

Please refer to FIG. 1, it is a schematic block diagram of a computer equipment 100 according to one embodiment of the present disclosure. The computer equipment 100 is equipment capable of reading and/or editing PDF files, such as a desktop computer, a tablet computer or a notebook computer without particular limitations.

The computer equipment 100 includes a processor 11, a display 15, a user interface 16 and a storage device connected via a bus 14. The storage device includes a non-volatile storage medium 12 and a memory 13. The non-volatile storage medium 12 records an operating system (OS) 121 and a computer program 122 therein. The computer program 122 includes programs for running methods of recognizing a PDF file and editing a PDF file as described in the embodiments of the present disclosure. The methods are described by examples hereinafter. The user interface 16 is a device provided for a user to operate the computer equipment 100.

The display 15 is a liquid crystal display (LCD), a quantum dot light emitting diode (QLED) display, a plasma display or an organic light emitting diode (OLED) display without particular limitations. The display 15 is used to show a PDF file and an editable PDF file thereon. For example, when a PDF file is opened by a general PDF reader (an APP), the PDF file is shown on the display 15; whereas, when a PDF file is opened by the device of the present disclosure and recognized by the method of the present disclosure, an editable PDF file is generated to be shown on the display 15.

The processor 11 includes, for example, a central processing unit (CPU) and/or a micro processing unit (MCU) that provides calculation and control ability to support operations of the computer equipment 100. Methods that the processor 11 runs the operating system 121 and the computer program 122, accesses the memory 13 and controls the display 15 to show corresponding contents via the bus 14 are known to the art and not main objectives of the present disclosure, and thus details thereof are not described herein.

The memory 13 provides an environment for operations of the computer program 122 in the non-volatile storage medium 12, e.g., recording contents of text objects (e.g., including fonts, coordinates, colors, sizes of characters, but not limited to), and graphic objects (e.g., including picture itself and graphic types, but not limited to) obtained in parsing a PDF file. And the memory 13 is for being accessed by the processor 11 while running the computer program 122, and stores the calculated results.

Figure 2:
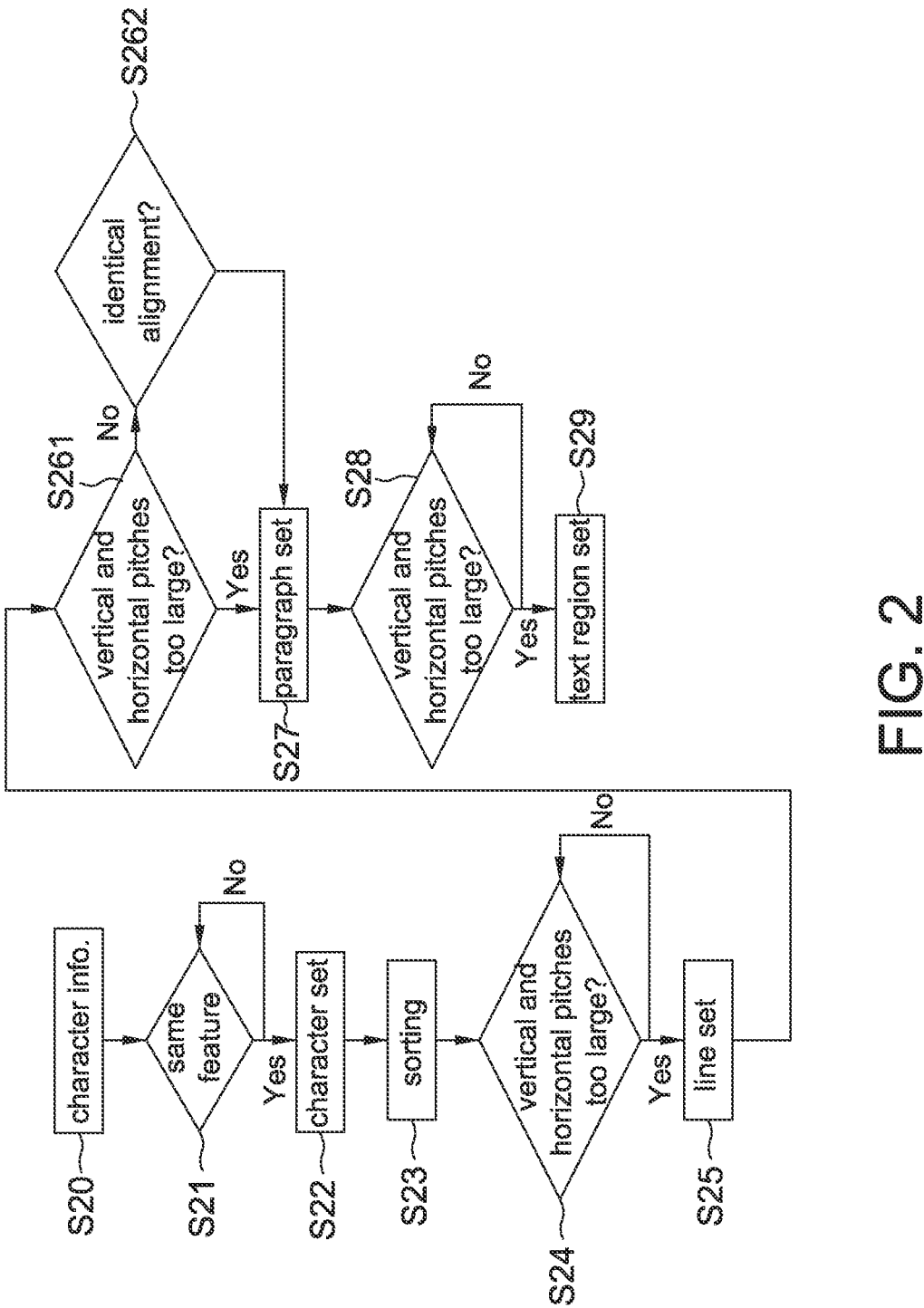
FIG. 2 is a flow chart of a method for recognizing a PDF file to generate text regions according to one embodiment of the present disclosure.

Please refer to FIG. 2, it is a flow chart of a method for recognizing a PDF file by the computer equipment 100 according to one embodiment of the present disclosure. The method includes the steps of: parsing a PDF file to obtain information of characters (Step S20); identifying features of adjacent characters in a horizontal direction (Step S21); merging characters having identical features to obtain character sets (Step S22); sequentially arranging the character sets (Step S23); identifying first vertical pitches and first horizontal pitches of the character sets (Step S24); generating line sets (Step S25); identifying second vertical pitches and second horizontal pitches (Step S261) and line alignments (Step S262) of the line sets; generating paragraph sets (Step S27); identifying third vertical pitches and third horizontal pitches of the paragraph sets (Step S28); and generating text region sets (Step S29).

The method for recognizing a PDF file of the present disclosure may be started by a user, for example, by selecting an item of editing/recognizing PFD file in a menu (e.g., embedded in an APP) of an opened PDF file (e.g., a file not yet being processed by the recognizing method of the present disclosure), but the present disclosure is not limited thereto. For example in another aspect, said editing/recognizing PFD file is directly performed when a PDF file is opened without particular limitations.

The method for editing/recognizing PDF file of the present disclosure is illustrated hereinafter by an example.

Step S20: The processor 11 runs the computer program 122 to parse a PDF file to obtain information of all characters (e.g., including features like fonts, coordinates, colors, sizes of characters), and the information is recorded in the memory 13 using a self-defining data structure. In this aspect, a character is referred to a single letter of language like English or a single word of language like Chinese, Japanese or Korean.

The character information is sequentially stored in the memory 13 according to coordinates of every character.

Figure 3A:
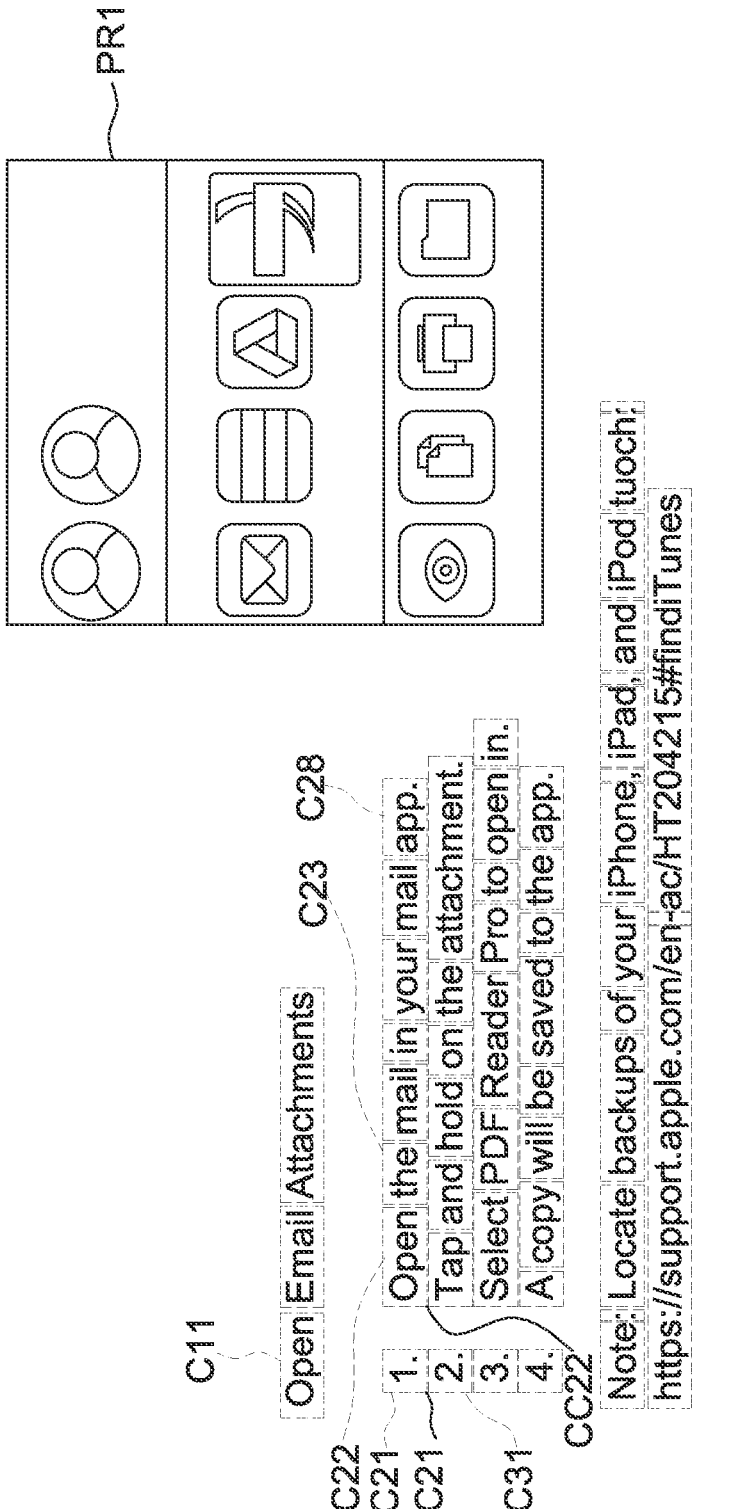
FIG. 3A is schematic diagram of the Step S22 in FIG. 2 to generate character sets.

Step S21-S22: Next, the processor 11 identifies whether features of adjacent characters are identical or not in a horizontal direction. Referring to FIG. 3A together, when the features of adjacent characters are identical, the processor 11 merges characters having the same features to obtain a character set, e.g., shown as a character set C11, a character set C21, a character set C22 . . . . For example in the character set C21, a character "1" and a character "." have identical features. When a space (e.g., between "." and "O") is encountered, it means that there is a feature change and thus a character set C21 is generated, and so on.

Step S23: In one aspect, before sequentially arranging the character sets, the processor 11 calculates intersections of boundaries of all characters in each character set C11, C21, C22 . . . , to obtain a boundary of each character set, e.g., dotted rectangles surrounding the character sets C11, C21, C22 . . . shown in FIG. 3A. A coordinate of the boundary of each character set is stored in the memory 13 corresponding to each character set, e.g., information of each character set including the character features mentioned above plus a boundary coordinate/position thereof, using a self-defining data structure.

After determining boundaries of every character set in the PDF file, the processor 11 sequentially arranges every character set according to respective boundary (e.g., the first set boundary herein) of the every character set, e.g., the respective boundary being a lower side, a left side or a crosspoint of the lower side and the left side (i.e. lower left corner of the boundary, shown as CC21, CC22 in FIG. 3A), from up to bottom and from left to right in the memory 13, but not limited thereto.

Step S24-S25: Next, the processor 11 determines line sets, e.g., L1, L2, L3 . . . in FIG. 3B, according to first vertical pitches and first horizontal pitches of adjacent character sets. In one aspect, the processor 11 calculates a height difference and a horizontal distance between two corresponding points, e.g., lower side or lower left corner (e.g., CC21, CC22 in FIG. 3A), of two first set boundaries of two adjacent character sets (e.g., C21 and C22 shown in FIG. 3A) respectively as the first vertical pitch and the first horizontal pitch. The processor 11 compares the first vertical pitch with a predetermined height distance (e.g., determined previously according to statistics of multiple PDF files). If the first vertical pitch (e.g., a height difference between character sets C28 and C31) is larger than the predetermined height distance, the two adjacent character sets are identified as character sets not in the same line. If the first vertical pitch is smaller than or equal to the predetermined height distance, the processor 11 then compares the first horizontal pitch with a predetermined distance (e.g., also determined previously according to statistics of multiple PDF files) to determine whether the two adjacent character sets are in the same line or not. If the first horizontal pitch (e.g., a horizontal distance between the character sets C28 and C31) is larger than the predetermined distance, the two adjacent character sets are identified as character sets not in the same line. If the first horizontal pitch (e.g., a horizontal distance between the character sets C21 and C22) is smaller than or equal to the predetermined distance, they are identified as character sets in the same line. This step may be performed by firstly identifying the horizontal distance and then identifying the height difference between adjacent character sets without particular limitations.

After the identification of the character sets C21 and C22 is completed, the processor 11 then identifies the character sets C22 and C23, and so on. After all character sets (e.g., all dotted rectangles in FIG. 3A) of the PDF file are identified, the line sets L1, L2, L3 . . . shown in FIG. 3B are obtained.

After the line sets L1, L2, L3 . . . are generated, the processor 11 calculates intersections of boundaries of all character sets (e.g., C21 to C28 of line L2) in each line of the line sets to obtain a boundary of each line, referred to a second set boundary herein. Similarly, coordinates of line boundaries of the line sets are stored in the memory 13 corresponding to each line using a self-defining data structure. Now, information of each line (e.g., L2) includes information of all character sets (e.g., C21 to C28) plus a coordinate/position of the line boundary thereof.

Figure 3B:
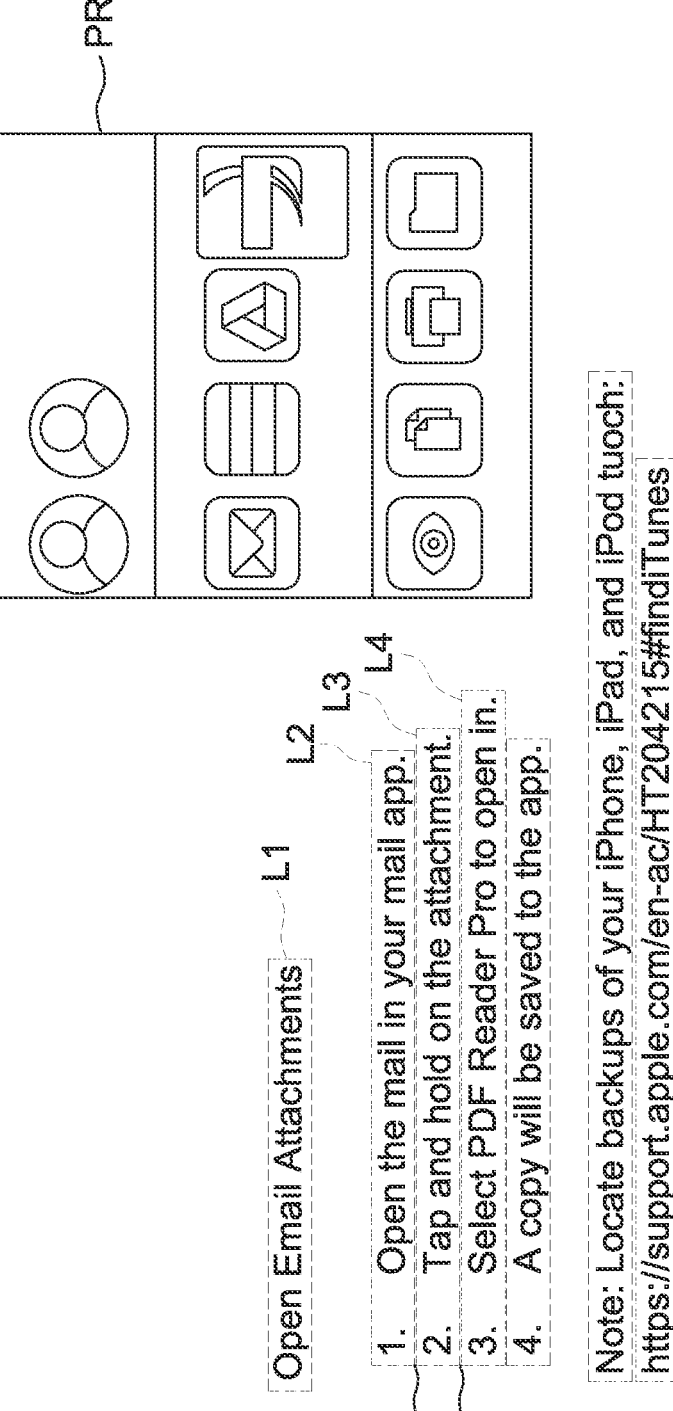
FIG. 3B is schematic diagram of the Step S25 in FIG. 2 to generate line sets.

After determining every line boundary of the line sets of the PDF file, the processor 11 sequentially arranges every line according to respective second set boundaries thereof, e.g., using a lower side, a left side or a crosspoint of the lower side and the left side (i.e. lower left corner of the boundary, shown as LC2, LC3 in FIG. 3B) of the boundary, from up to bottom and from left to right in the memory 13, but not limited thereto.

Step S261-S262: Then, the processor 11 determines paragraph sets, e.g., P1, P2, P3 . . . shown in FIG. 3C, according to second vertical pitches, second horizontal pitches and line alignments of adjacent lines (e.g., adjacent in the vertical direction herein). In one aspect, the processor 11 calculates a height difference and a horizontal distance between two corresponding points, e.g., lower side or lower left corner (e.g., LC2, LC3 in FIG. 3B) of two second set boundaries of adjacent lines (e.g., L2 and L3 shown in FIG. 3B) respectively as the second vertical pitch and the second horizontal pitch. The processor 11 compares the second vertical pitch with a predetermined height distance (e.g., 1.5 times of line height, but not limited to). If the second vertical pitch (e.g., a height difference between the lines L3 and L4) is larger than the predetermined height distance, the two adjacent lines are identified as lines not in the same paragraph. If the second vertical pitch is smaller than or equal to the predetermined height distance, the processor 11 then compares the second horizontal pitch with a predetermined distance (e.g., also determined previously according to statistics of multiple PDF files) to determine whether the adjacent lines are in the same paragraph or not. If the second horizontal pitch (e.g., a horizontal distance between lower left corners) is larger than the predetermined distance, the two adjacent lines are identified as lines not in the same paragraph. If the second horizontal pitch is smaller than or equal to the predetermined distance, the two adjacent lines are identified as lines in the same paragraph.

The processor 11 further identifies whether adjacent lines have an identical alignments according to a horizontal distance respectively between front sides and between rear sides of boundaries of the adjacent lines. If the alignments are different (e.g., horizontal distance larger than predetermined threshold), the adjacent lines are not in the same paragraph; whereas, if the alignments are the same (e.g., horizontal distance smaller than or equal to predetermined threshold), the adjacent lines are in the same paragraph.

In one aspect, the processor 11 identifies whether adjacent lines are in the same paragraph only according to the second vertical pitch and the second horizontal pitch (corresponding to alignment of corresponding lines) of the adjacent lines. In another aspect, the processor 11 identifies whether adjacent lines are in the same paragraph only according to the second vertical pitch and the line alignment.

Figure 3C:
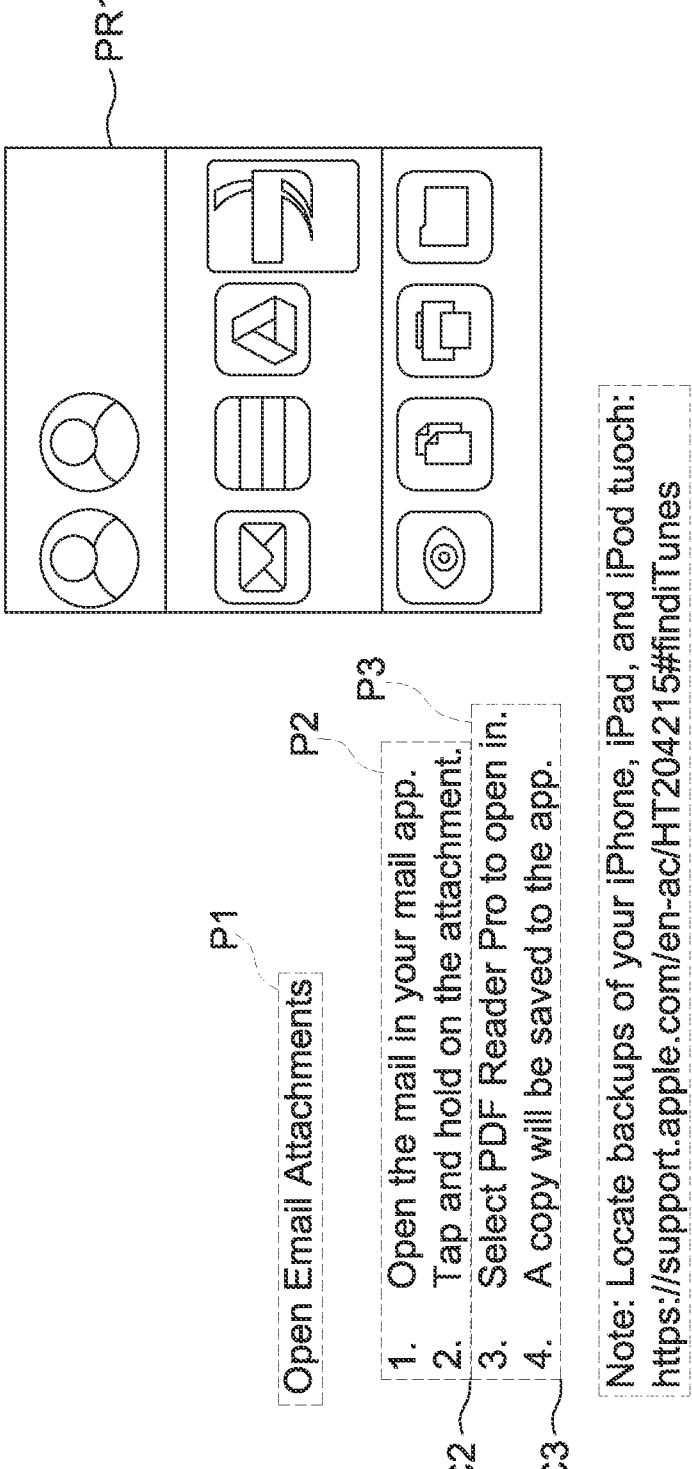
FIG. 3C is schematic diagram of the Step S27 in FIG. 2 to generate paragraph sets.

After the identification of the lines L1 and L2 is completed, the processor 11 then identifies the lines L2 and L3, and so on till all lines (e.g., all dotted rectangles in FIG. 3B) of the line sets in a current PDF file is identified, and the paragraph sets P1, P2, P3 . . . shown in FIG. 3C are generated.

After the paragraph sets P1, P2, P3 . . . are generated, the processor 11 calculates intersections of boundaries of all lines (e.g., paragraph P2 including lines L2 and L3) in each paragraph of the paragraph sets to obtain a boundary of each paragraph, referred to a third set boundary herein. Similarly, coordinates of boundaries of every paragraph set are stored in the memory 13 corresponding to each paragraph using a self-defining data structure. Now, information of each paragraph includes information of all lines therein plus a coordinate/position of the paragraph boundary.

After determining the boundaries of every paragraph set of the PDF file, the processor 11 sequentially arranges every paragraph according to respective third set boundaries thereof, e.g., using a lower side, a left side or a crosspoint of the lower side and the left side (i.e. lower left corner of the boundary, shown as PC2, PC3 in FIG. 3C) of each paragraph, from up to bottom and from left to right in the memory 13, but not limited thereto.

Steps S28-S29: Next, the processor 11 determines text region sets, e.g., TR1, TR2, TR3 . . . in FIG. 3D, according to third vertical pitches and third horizontal pitches of adjacent paragraph sets. In one aspect, the processor 11 calculates a height difference and a horizontal distance between two corresponding points, e.g., lower side or lower left corner of two third set boundaries of adjacent paragraphs (e.g., TR2 and TR3 shown in FIG. 3D) respectively as the third vertical pitch and the third horizontal pitch. The processor 11 compares the third vertical pitch with a predetermined height distance (e.g., 1.5 times of line space, but not limited to). If the third vertical pitch is larger than the predetermined height distance, the two adjacent paragraphs are identified as paragraphs not in the same text region. If the third vertical pitch is smaller than or equal to the predetermined height distance, the processor 11 then compares the third horizontal pitch with a predetermined distance (e.g., 1.5 times of line height, but not limited to) to determine whether the adjacent paragraphs are at the same text region or not. If the third horizontal pitch is larger than the predetermined distance, they are identified as paragraphs not in the same text region. If the third horizontal pitch is smaller than or equal to the predetermined distance, the two adjacent paragraphs are identified as paragraphs in the same text region. Similarly, this step may be performed by firstly identifying the horizontal distance and then identifying the height difference between adjacent paragraph sets without particular limitations.

Figure 3D:
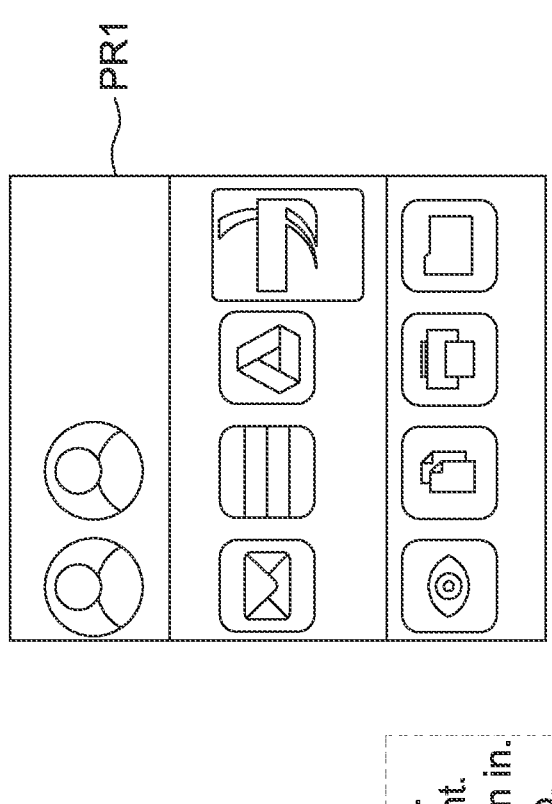
FIG. 3D is schematic diagram of the Step S29 in FIG. 2 to generate text region sets.

After the identification of the paragraphs P1 and P2 is completed, the processor 11 then identifies the paragraphs P2 and P3, and so on. After all paragraph sets (e.g., all dotted rectangles in FIG. 3C) of the PDF file are identified, the text region sets TR1, TR2, TR3 . . . shown in FIG. 3D are obtained.

Figure 4:
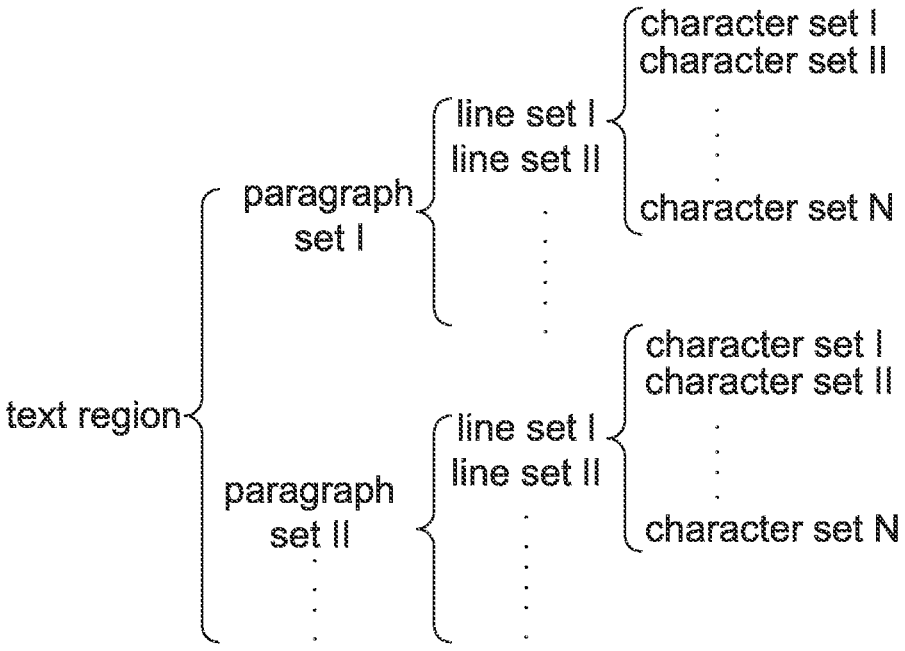
FIG. 4 is a schematic diagram of a self-defining data structure stored in a memory according to one embodiment of the present disclosure.

In the present disclosure, after the method for recognizing a PDF file in FIG. 2 is accomplished, at least one text region is generated. In the memory 13, corresponding to each text region (e.g., TR2 in FIG. 3D), the covered paragraphs thereof (e.g., P2 and P3 shown in FIG. 3C) are stored using a self-defining data structure; corresponding to each paragraph (e.g., P2 in FIG. 3C), the covered lines thereof (e.g., L2 and L3 in FIG. 3B) are stored using the self-defining data structure; corresponding to each line (e.g., L2 in FIG. 3B), the covered character sets thereof (e.g., C21 to C28 in FIG. 3A) are stored using the self-defining data structure, e.g., as shown in FIG. 4, in the memory 13. In this way, when one text region is selected to be edited using the editing method shown in FIG. 5, information of all characters in the selected text region is also selected.

It should be mentioned that the processor 11 calculates the Steps S20-S28 in the memory 13, and it is not necessary to show the processes of these steps on the display 15. The processor 11 only shows dotted rectangles of the text region sets after the Step S29 is accomplished to indicate editable text regions, e.g., dotted rectangles shown in FIG. 3D.

In addition, the method for recognizing a PDF file of the present disclosure further includes: parsing graphic objects of the PDF file and taking each picture parsed from the PDF file as a graphic region. The processor 11 further controls the display 15 to show a rectangle (e.g., PR1 shown in FIG. 3D) outside the graphic region to indicate an editable graphic region.

It is appreciated that an editable region herein is not limited to be indicated by a dotted rectangle but indicated by other distinguishable features, e.g., reversing out, solid rectangle or coloring without particular limitations.

Figure 5:
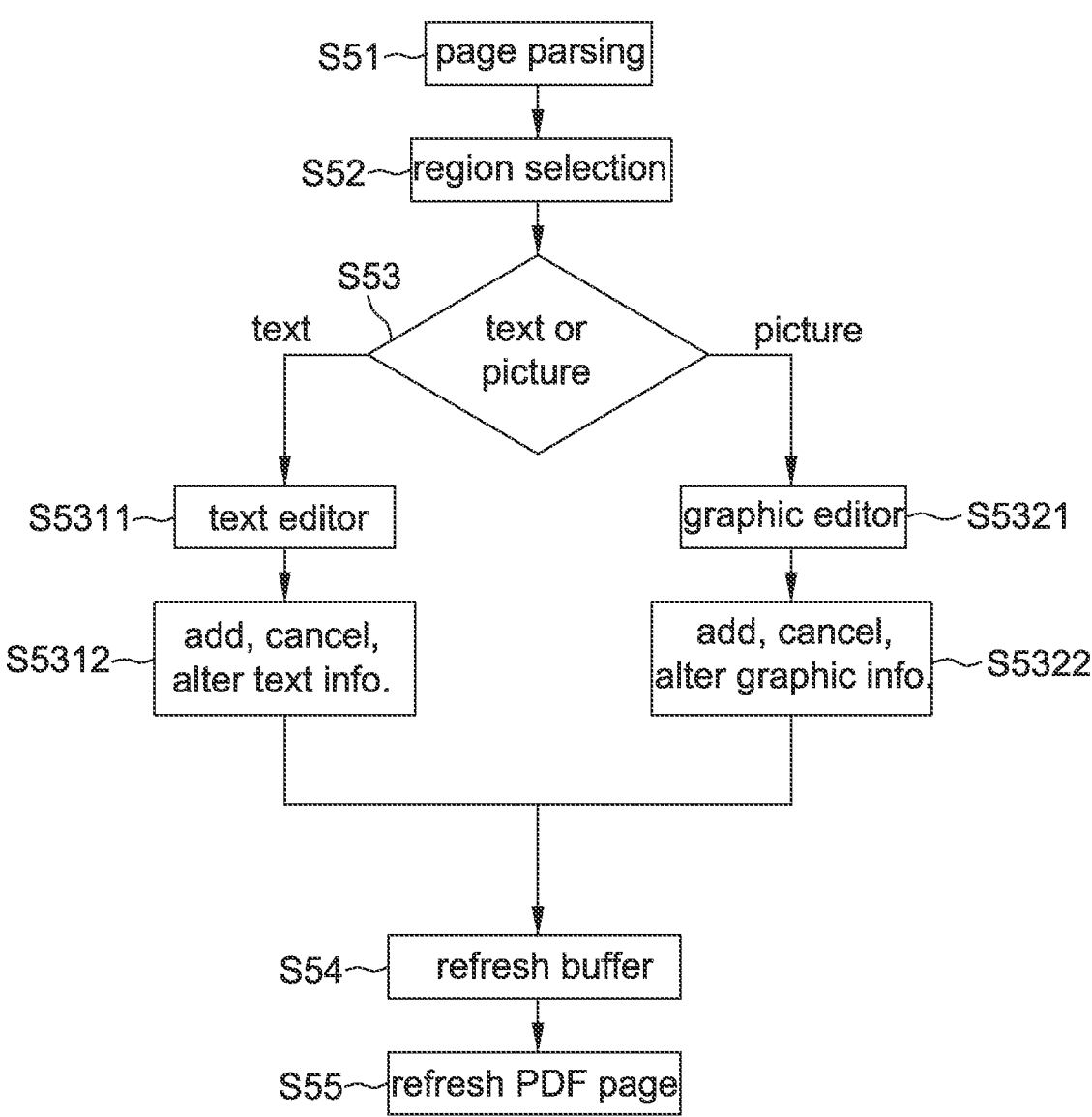
FIG. 5 is a flow chart of a method for editing a PDF file according to one embodiment of the present disclosure.

Please refer to FIG. 5, it is a flow chart of a method of editing a PDF file according to one embodiment of the present disclosure.

Step S51: After opening a target PDF file and executing the editing/recognizing item, the processor 11 starts to run the computer program 122 to perform the method for recognizing a PDF file as shown in FIG. 2. For example, the processor 11 performs the computer program 122 to parse the PDF file to obtain information of characters, generate character sets (e.g., C11, C21, C23 . . . shown in FIG. 3A) according to features of the characters, generate line sets (e.g., L1 to L4 . . . shown in FIG. 3B) according to heights and horizontal positions of the character sets, generate paragraph sets (e.g., P1 to P3 . . . shown in FIG. 3C) according to a height and a horizontal position of each line of the line sets, generate text region sets (e.g., TR1 to TR3 shown in FIG. 3D) according to a height and a horizontal position of each paragraph of the paragraph sets, and control the display 15 to show the text region sets in the PDF file as editable text regions (e.g., generating additional indicating feature, e.g., dotted rectangle, but not limited to). In addition, the processor 11 further parses graphic objects in the PDF file and takes each picture parsed from the PDF file as one graphic region, and controls the display 15 to show the one graphic region in the PDF file as an editable graphic region (e.g., referring to PR1 shown in FIGS. 3A to FIG. 3D).

Step S52: Next, the processor 11 identifies a selection signal from a user interface 16 (e.g., a mouse device, a keyboard, a touch screen, a gesture control device or the like) to confirm a selected region. Said selected region is one of the text region set and the graphic region generated in analyzing a page in the Step S51. After the selected region is confirmed, the processor 11 further controls the display 15 to show a different feature indicating that a region is selected, e.g., turning a dotted rectangle to a solid rectangle, but not limited to.

Step S53: Next, the processor 11 identifies whether the selected region is a text region or a graphic region.

Step S5311-S5312: When the selected region is identified as a text region, a text editor is generated so as to perform inserting, adding, cancelling, replacing and amending text information in the selected region. For example, the processor 11 performs (I) finding a sequence of a paragraph in the text region thereof in the memory 13 according to a position coordinate of a click operation (according to the control signal from the user interface 16); receiving inputted character(s) from the user interface 16; (III) finding a related character type of a font of a current character, and filling the character if there is a corresponding character type, but entering a character bank to search a fulfilled character type to be added to the PDF file if there is no corresponding character type, and then inserting the character; (IV) rearranging the paragraph with the inserted current character; (V) calculating a boundary of a current paragraph to determine whether a height of the current paragraph has a variation, e.g., subtracting a lower side of an original paragraph (i.e. paragraph before editing) from a lower side of the current paragraph (i.e. edited paragraph), but not limited to; (VI) adding the variation to paragraphs behind the current paragraph when there is a variation of the paragraph height so as to accomplish the rearrangement of characters in the selected text region. The processor 11 may perform various editing on the selected text region according to input from the user interface 13, and the above example is only intended to illustrate but not to limit the present disclosure.

After one editing completed, the data structure stored in the text editor is transformed to the data structure for rendering a PDF page.

Step S5321-S5322: When identifying a selected region is a graphic region, a graphic editor is created to perform operations like zooming, moving, trimming, rotating, mirroring of a picture. The graphic editor may use the editors known to the art or a self-defining editor without particular limitation. The present disclosure is to provide an editable graphic region to be directly selected from a PDF page after the page analyzing in the Step S51 is performed.

Step S54: The operated text or picture is re-generated as an image, which is used to refresh the display 15.

Step S55: The amended contents are written into the PDF file to refresh the PDF page so as to accomplish the amendment on the PDF file.

As mentioned above, after the amended/edited PDF file is stored, the stored PDF file is opened as an un-editable PDF page if it is opened by other PDF readers. The stored PDF file is directly opened as an editable PDF page if it is opened by the PDF editor of the present disclosure, or generated as an editable PDF page after running the editing/recognizing operations in the PDF editor of the present disclosure.

The present disclosure further provides a computer equipment including a storage device and a processor 11. The storage device is used to record a computer program 122. The processor 11 is used to run the computer program 122 in the storage device to perform the method of recognizing a PDF file as shown in FIG. 2 and editing a PDF file as shown in FIG. 5.

The present disclosure further provides a content accessible memory 12 which records a computer program 122. The computer program 122 is run by the processor 11 to implement the method of recognizing a PDF file as shown in FIG. 2 and editing a PDF file as shown in FIG. 5.

It should be mentioned that all values, e.g., the predetermined height distance and the predetermined distance, mentioned in the present disclosure are only intended to illustrate but not to limit the present disclosure.

As mentioned above, because a PDF file generally cannot be edited directly, the prior art needs to transform a PDF file to a document having another format before editing such that it is inconvenient and time wasting. Furthermore, mistakes may occur during the format transformation. Accordingly, the present disclosure further provides a method for recognizing a PDF file to generate editable text regions and graphic regions (e.g., referring to FIG. 2), a device for editing a PDF file (e.g., referring to FIG. 5), a computer equipment and a storage medium (e.g., referring to FIG. 1). Accordingly, if it is intended to perform little amendment on a PDF file, the whole PDF file is not necessary to be transformed to an editable document having other formats. A user may select a region desired to be edited in the editable PDF file generated by the present disclosure and directly perform the editing/amending. After the editing is accomplished, the editable PDF file is restored as a PDF file such that the user experience is improved.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A method for recognizing a portable document format (PDF) file, comprising:

parsing text objects of the PDF file to obtain information of characters;

identifying features of adjacent characters in a horizontal direction, and merging characters having identical features to obtain character sets, wherein one character set is generated upon encountering a space, which indicates a feature change;

determining line sets according to first vertical pitches and first horizontal pitches of adjacent character sets to group the adjacent character sets within a first predetermined height distance and within a first predetermined horizontal distance as one line set using corresponding points of boundaries of the adjacent character sets;

determining paragraph sets according to second vertical pitches and second horizontal pitches of adjacent lines of the line sets to group adjacent line sets within a second predetermined height distance and within a second predetermined horizontal distance as one paragraph set using corresponding points of boundaries of the adjacent line sets;

determining text region sets according to third vertical pitches and third horizontal pitches of adjacent paragraphs of the paragraph sets;

calculating an intersection set of boundaries of all characters in the character sets to obtain first set boundaries of the character sets, wherein the first set boundaries are configured for a processor to sequentially store every character set in a memory using a self-defining data structure;

calculating an intersection set of boundaries of all character sets in each line of the line sets to obtain a second set boundary of said each line, wherein the second set boundaries are configured for the processor to sequentially store every line set in the memory using the self-defining data structure; and calculating an intersection set of boundaries of all lines in each paragraph of the paragraph sets to obtain a third set boundary of said each paragraph, wherein the third set boundaries are configured for the processor to sequentially store every paragraph set in the memory using the self-defining data structure, wherein in the self-defining data structure stored in the memory, information of said each line comprises information of the all character sets therein plus a coordinate of a line boundary of said each line, and information of said each paragraph comprises information of all lines therein plus a coordinate of a paragraph boundary of said each paragraph.

2. The method as claimed in claim 1, further comprising:

parsing graphic objects of the PDF file and taking each picture as a graphic region.

3. The method as claimed in claim 1, wherein the first vertical pitches and the first horizontal pitches are calculated according to two corresponding points of two first set boundaries of the adjacent character sets;

the second vertical pitches and the second horizontal pitches are calculated according to two corresponding points of two second set boundaries of the adjacent lines of the line sets; and the third vertical pitches and the third horizontal pitches are calculated according to two corresponding points of two third set boundaries of the adjacent paragraphs of the paragraph sets.

4. The method as claimed in claim 1, further comprising:

sequentially arranging the all character sets of the PDF file from top to bottom and from left to right according to lower sides of the first set boundaries of the every character set;

sequentially arranging all lines of the PDF file from top to bottom and from left to right according to lower sides of the second set boundaries of every line; and sequentially arranging all paragraphs of the PDF file from top to bottom and from left to right according to lower sides of the third set boundaries of every paragraph.

5. The method as claimed in claim 1, wherein the features comprise a font, a size and a color of the characters.

6. A device configured to provide an editable PDF file, the device comprising:

a display, configured to show a PDF file;

a non-volatile storage medium, configured to record a computer program;

a memory, configured to provide an environment for operations of the computer program in the non-volatile storage medium; and a processor, configured to run the computer program to parse the PDF file to obtain information of characters, generate character sets according to features of the characters, wherein one character set is generated upon encountering a space, which indicates a feature change, generate line sets according to heights and horizontal positions of the character sets to group adjacent character sets within a first predetermined height distance and within a first predetermined horizontal distance as one line set using corresponding points of boundaries of the adjacent character sets, generate paragraph sets according to a height and a horizontal position of each line of the line sets to group adjacent line sets within a second predetermined height distance and within a second predetermined horizontal distance as one paragraph set using corresponding points of boundaries of the adjacent line sets, generate text region sets according to a height and a horizontal position of each paragraph of the paragraph sets, calculate an intersection set of boundaries of all characters in the character sets to obtain first set boundaries of the character sets, wherein the first set boundaries are configured for a processor to sequentially store every character set in the memory using a self-defining data structure, calculate an intersection set of boundaries of all character sets in each line of the line sets to obtain a second set boundary of said each line, wherein the second set boundaries are configured for the processor to sequentially store every line set in the memory using the self-defining data structure, calculate an intersection set of boundaries of all lines in each paragraph of the paragraph sets to obtain a third set boundary of said each paragraph, wherein the third set boundaries are configured for the processor to sequentially store every paragraph set in the memory using the self-defining data structure, and control the display to show the text region sets as editable text regions in the PDF file, wherein in the self-defining data structure stored in the memory, information of said each line comprises information of the all character sets therein plus a coordinate of a line boundary of said each line, and information of said each paragraph comprises information of all lines therein plus a coordinate of a paragraph boundary of said each paragraph.

7. The device as claimed in claim 6, wherein the processor is further configured to parse graphic objects in the PDF file and take each picture parsed from the PDF file as one graphic region, and control the display to show the one graphic region as an editable graphic region in the PDF file.

8. A computer equipment, comprising
a storage device, configured to record a computer program; and
a processor, configured to run the computer program recorded in the storage device to perform a method for recognizing a PDF file, comprising:

parsing text objects of the PDF file to obtain information of characters;

identifying features of adjacent characters in a horizontal direction, and merging characters having identical features to obtain character sets, wherein one character set is generated upon encountering a space, which indicates a feature change;

determining line sets according to first vertical pitches and first horizontal pitches of adjacent character sets to group the adjacent character sets within a first predetermined height distance and within a first predetermined horizontal distance as one line set using corresponding points of boundaries of the adjacent character sets;

determining paragraph sets according to second vertical pitches and second horizontal pitches of adjacent lines of the line sets to group adjacent line sets within a second predetermined height distance and within a second predetermined horizontal distance as one paragraph set using corresponding points of boundaries of the adjacent line sets;

determining text region sets according to third vertical pitches and third horizontal pitches of adjacent paragraphs of the paragraph sets;

calculating an intersection set of boundaries of all characters in the character sets to obtain first set boundaries of the character sets, wherein the first set boundaries are configured for a processor to sequentially store every character set in a memory using a self-defining data structure;

calculating an intersection set of boundaries of all character sets in each line of the line sets to obtain a second set boundary of said each line, wherein the second set boundaries are configured for the processor to sequentially store every line set in the memory using the self-defining data structure; and calculating an intersection set of boundaries of all lines in each paragraph of the paragraph sets to obtain a third set boundary of said each paragraph, wherein the third set boundaries are configured for the processor to sequentially store every paragraph set in the memory using the self-defining data structure, wherein in the self-defining data structure stored in the memory, information of said each line comprises information of the all character sets therein plus a coordinate of a line boundary of said each line, and information of said each paragraph comprises information of all lines therein plus a coordinate of a paragraph boundary of said each paragraph.

9. The computer equipment as claimed in claim 8, wherein the method further comprises:

parsing graphic objects of the PDF file and taking each picture as a graphic region.

10. The computer equipment as claimed in claim 8, wherein the first vertical pitches and the first horizontal pitches are calculated according to two corresponding points of two first set boundaries of the adjacent character sets;

the second vertical pitches and the second horizontal pitches are calculated according to two corresponding points of two second set boundaries of the adjacent lines of the line sets; and the third vertical pitches and the third horizontal pitches are calculated according to two corresponding points of two third set boundaries of the adjacent paragraphs of the paragraph sets.

11. The computer equipment as claimed in claim 8, wherein the method further comprises:

sequentially arranging the all character sets of the PDF file from top to bottom and from left to right according to lower sides of the first set boundaries of the every character set;

sequentially arranging all lines of the PDF file from top to bottom and from left to right according to lower sides of the second set boundaries of every line; and sequentially arranging all paragraphs of the PDF file from top to bottom and from left to right according to lower sides of the third set boundaries of every paragraph.

12. The computer equipment as claimed in claim 8, wherein the features comprise a font, a size and a color of the characters.

13. A non-transitory content accessible memory, the non-transitory content accessible memory being recorded with a computer program, wherein the computer program is run by a processor to perform a method for recognizing a PDF file, comprising:

parsing text objects of the PDF file to obtain information of characters;

identifying features of adjacent characters in a horizontal direction, and merging characters having identical features to obtain character sets, wherein one character set is generated upon encountering a space, which indicates a feature change;

determining line sets according to first vertical pitches and first horizontal pitches of adjacent character sets to group the adjacent character sets within a first predetermined height distance and within a first predetermined horizontal distance as one line set using corresponding points of boundaries of the adjacent character sets;

determining paragraph sets according to second vertical pitches and second horizontal pitches of adjacent lines of the line sets to group adjacent line sets within a second predetermined height distance and within a second predetermined horizontal distance as one paragraph set using corresponding points of boundaries of the adjacent line sets;

determining text region sets according to third vertical pitches and third horizontal pitches of adjacent paragraphs of the paragraph sets;

calculating an intersection set of boundaries of all characters in the character sets to obtain first set boundaries of the character sets, wherein the first set boundaries are configured for a processor to sequentially store every character set in the content accessible memory using a self-defining data structure;

calculating an intersection set of boundaries of all character sets in each line of the line sets to obtain a second set boundary of said each line, wherein the second set boundaries are configured for the processor to sequentially store every line set in the content accessible memory using the self-defining data structure; and calculating an intersection set of boundaries of all lines in each paragraph of the paragraph sets to obtain a third set boundary of said each paragraph, wherein the third set boundaries are configured for the processor to sequentially store every paragraph set in the content accessible memory using the self-defining data structure, wherein in the self-defining data structure stored in the content accessible memory, information of said each line comprises information of the all character sets therein plus a coordinate of a line boundary of said each line, and information of said each paragraph comprises information of all lines therein plus a coordinate of a paragraph boundary of said each paragraph.

14. The content accessible memory as claimed in claim 13, wherein the method further comprises:

parsing graphic objects of the PDF file and taking each picture as a graphic region.

15. The content accessible memory as claimed in claim 13, wherein the first vertical pitches and the first horizontal pitches are calculated according to two corresponding points of two first set boundaries of the adjacent character sets;

the second vertical pitches and the second horizontal pitches are calculated according to two corresponding points of two second set boundaries of the adjacent lines of the line sets; and the third vertical pitches and the third horizontal pitches are calculated according to two corresponding points of two third set boundaries of the adjacent paragraphs of the paragraph sets.

16. The content accessible memory as claimed in claim 13, wherein the method further comprises:

sequentially arranging the all character sets of the PDF file from top to bottom and from left to right according to lower sides of the first set boundaries of the every character set;

sequentially arranging all lines of the PDF file from top to bottom and from left to right according to lower sides of the second set boundaries of every line; and sequentially arranging all paragraphs of the PDF file from top to bottom and from left to right according to lower sides of the third set boundaries of every paragraph.

17. The content accessible memory as claimed in claim 13, wherein the features comprise a font, a size and a color of the characters.

* * * * *